(12) United States Patent
Haltiner, Jr. et al.

(10) Patent No.: US 7,758,989 B2
(45) Date of Patent: Jul. 20, 2010

(54) MODULAR FUEL CELL CASSETTE SPACERS FOR FORMING A SOLID-OXIDE FUEL CELL STACK

(75) Inventors: Karl J. Haltiner, Jr., Fairport, NY (US); Curtis D. Lamb, Scottsville, NY (US); James S. Vordonis, Penfield, NY (US)

(73) Assignee: Delphi Technologies, Inc., Troy, MI (US)

( * ) Notice: Subject to any disclaimer, the term of this patent is extended or adjusted under 35 U.S.C. 154(b) by 966 days.

(21) Appl. No.: 11/527,908

(22) Filed: Sep. 27, 2006

(65) Prior Publication Data

US 2007/0020506 A1 Jan. 25, 2007

Related U.S. Application Data

(63) Continuation-in-part of application No. 11/027,095, filed on Dec. 30, 2004, now Pat. No. 7,306,872.

(51) Int. Cl.
*H01M 2/00* (2006.01)
(52) U.S. Cl. ........................................................ 429/34
(58) Field of Classification Search .................... 429/34
See application file for complete search history.

(56) References Cited

U.S. PATENT DOCUMENTS 3,814,631 A 6/1974 Warszawski et al.
4,160,856 A 7/1979 Warszawski et al.
4,753,857 A 6/1988 Hosaka
5,256,499 A 10/1993 Minh et al.
5,532,073 A 7/1996 Hirata et al.
6,261,711 B1 7/2001 Matlock et al.
2006/0147786 A1 7/2006 Haltiner, Jr. et al.

OTHER PUBLICATIONS

International Search Report dated May 16, 2008.

*Primary Examiner*—Patrick Ryan
*Assistant Examiner*—Thomas H. Parsons
(74) *Attorney, Agent, or Firm*—Thomas N. Twomey

(57) ABSTRACT

In a modular fuel cell cassette for forming a fuel cell stack, anode openings in the mounting plate and separator plate are separated and connected by modular spacer rings such that the cassette is incompressible at operating temperatures and compressive loads within the stack. The spacer rings are formed in modules wherein all of the rings required for all of the anode supply chimneys or all of the anode exhaust chimneys of any given cassette are ganged together and include a perimeter rail to which the rings are connected which automatically orients and positions the rings within the cassette during assembly thereof. The present invention eliminates the prior art need for individually positioning and spot welding each prior art ring in place prior to assembly of a prior art cassette. Two different structural embodiments for a spacer ring module are disclosed.

10 Claims, 6 Drawing Sheets

MODULAR FUEL CELL CASSETTE SPACERS FOR FORMING A SOLID-OXIDE FUEL CELL STACK

RELATIONSHIP TO OTHER APPLICATIONS AND PATENTS

The present application is a Continuation-In-Part of a U.S. patent application Ser. No. 11/027,095, filed Dec. 30, 2004 now U.S. Pat. No. 7,306,872 and published Jul. 6, 2006 as U.S. Published Patent Application 2006/0147786 A1 (now U.S. Pat. No. 7,306,872).

This invention was made with United States Government support under Government Contract/Purchase Order No. DE-FC26-02NT41246. The Government has certain rights in this invention.

TECHNICAL FIELD

The present invention relates to fuel cells; more particularly, to solid-oxide fuel cells; and most particularly, to modular fuel cell cassette spacers for use in assembling a fuel cell stack.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for a transportation application, an SOFC is preferably fueled by "reformate" gas, which is the effluent from a catalytic liquid or gaseous hydrocarbon oxidizing reformer, also referred to herein as "fuel gas". Reformate typically includes amounts of carbon monoxide (CO) as fuel in addition to molecular hydrogen.

A complete fuel cell stack assembly includes fuel cell subassemblies and a plurality of components known in the art as interconnects, which electrically connect the individual fuel cell subassemblies in series. Typically, the interconnects include a conductive foam or weave disposed in the fuel gas and air flow spaces adjacent the anodes and cathodes of the subassemblies.

In the prior art, a fuel cell stack is assembled typically by first laying up each of the fuel cell subassemblies in a jig, forming a plurality of repetitive modular fuel cell units known in the art, and referred to herein, as "cassettes". Typically, a fuel cell cassette comprises a ceramic solid-oxide electrolyte layer and a cathode layer coated onto a relatively thick, structurally significant anode element. In such a prior art assembly, each of the cassettes becomes a structural and load-bearing element of the stack.

At the elevated operating temperatures of an SOFC stack, typically in the range of about 700° C. to about 1000° C., most of the components of a cassette have very little inherent mechanical strength and would collapse if not for internal spacer rings disposed within each cassette around the anode fuel gas openings, collectively comprising supply and exhaust "chimneys" within a stack. Prior art spacer rings are fabricated so that they form a solid column of metal having radial openings to allow the anode fuel gas to flow into and out of the cassette. The assembly load of a stack thus is carried through the spacer rings.

A prior art spacer ring is a sheet metal part which is stamped and formed to achieve the desired geometry. This spacer ring is difficult to form, resulting in a part that is relatively expensive even with production tooling in high volumes. Further, each cassette requires a plurality of spacer rings (typically 8), and each ring must be tack welded into place to the cassette shell, accurately and firmly, prior to cassette assembly, adding further positioning and attachment cost and complexity to the assembly operation.

What is needed in the art is an improved spacer ring that is less expensive to manufacture and less expensive to install into a cassette during assembly thereof.

It is a principal object of the present invention to reduce the cost, difficulty, and complexity of mass-manufacturing fuel cell stack assemblies.

SUMMARY OF THE INVENTION

Briefly described, a modular fuel cell cassette for use in assembling a fuel cell stack is a sheet metal assembly comprising a metal separator plate and a metal cell-mounting plate so formed that when they are joined at their perimeter edges to form the cassette, a cavity is formed between them which can contain a gas stream that feeds a fuel cell subassembly attached within the cassette to the mounting plate. Outboard of the fuel cell subassembly, the separator plate and cell-mounting plate are perforated by openings to form chimney-type manifolds for supplying fuel gas to the anode and air to the cathode, and for exhausting the corresponding gases from the stack. The fuel cell subassembly is attached to, and insulated from, the mounting plate by a dielectric seal. The mounting plate includes an opening through which one of the electrodes is accessible, preferably the cathode, and through which a conductive interconnect element extends to make contact with the outer surface of the next-adjacent cassette in a stack.

The anode openings in the mounting plate and separator plate are separated and connected by modular spacer rings such that the cassette is incompressible. The spacer rings include radial openings which allow fuel gas to flow from the anode supply chimney into the anode gas channel in the cassette and also back into the anode exhaust chimney. In accordance with the present invention, the spacer rings are formed in modules wherein all of the rings required for all of the anode supply chimneys or all of the anode exhaust chimneys of any given cassette are ganged together and include a perimeter element to which the rings are connected which automatically orients and positions the rings within the cassette during assembly thereof. The present invention eliminates the prior art need for individually positioning and spot welding each ring in place prior to assembly of a cassette. Two different structural embodiments for a spacer ring module are disclosed.

BRIEF DESCRIPTION OF THE DRAWINGS

The present invention will now be described, by way of example, with reference to the accompanying drawings, in which.

DESCRIPTION OF THE PREFERRED EMBODIMENTS

The invention is directed to a modular spacer ring element which may be substituted in an otherwise prior art fuel cell cassette 100 and fuel cell stack, in a greatly simplified assembly procedure. Therefore, it is useful to review here such a prior art fuel cell cassette 100 to understand how an improved modular spacer ring element 326,426 may be used to replace the prior art individual spacer rings 126.

Prior art fuel cell cassette 100 is substantially as disclosed in the parent patent application referenced hereinabove and made public in US Published Patent Application No. 2006/0147786 A1(now U.S. Pat. No. 7,306,872), the relevant disclosures of which are incorporated herein by reference.

Figure 1:
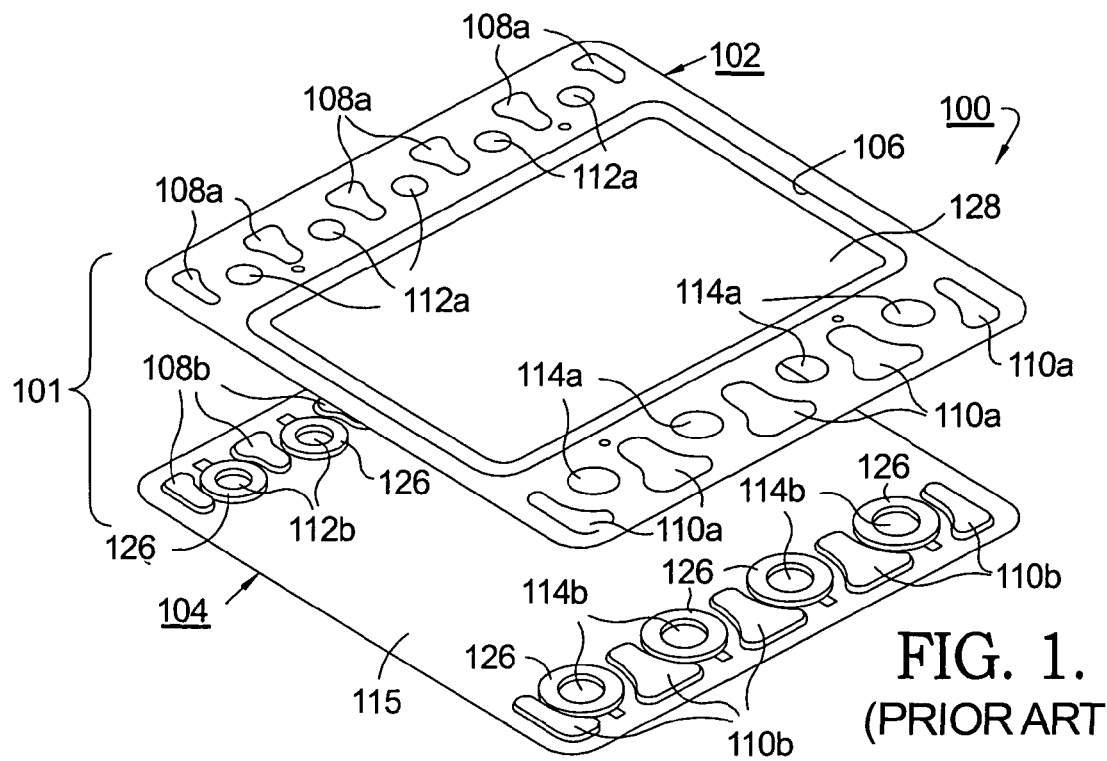
FIG. 1 is an exploded isometric view of a prior art fuel cell cassette.

Referring to FIG. 1, a prior art fuel cell cassette 100 includes a cassette housing 101 including a fuel cell mounting plate 102 and a separation plate 104. Mounting plate 102 includes a large central electrode opening 106 for receiving a fuel cell subassembly 128 as described below. Outboard of central electrode opening 106 are cathode air inlets 108a, cathode air outlets 110a, fuel gas inlets 112a, and fuel gas outlets 114a. Separation plate 104 is provide with similar and mating air and fuel openings 108b,110b,112b, and 114b, respectively, said electrode and separation plate inlets and outlets defining respective supply and exhaust chimneys for air and fuel gas. Separation plate 104 is formed as a shallow tray 115 such that a cavity is created between plates 102,104 for receiving fuel cell components and fuel gas as described below. Preferably, the mounting and separation plates are formed as by stamping or drawing from thin sheet stock (0.1 to 1.0 mm) of a ferritic stainless steel, although other materials such as austenitic stainless steel or high temperature alloys may also be acceptable. During assembly, prior art plates 102,104 are joined to define a cassette housing by formation of a metallurgical bond at their edges and around each of the air inlets and outlets such that only openings 112,114 have access to the interior of the cassette.

Figure 4:
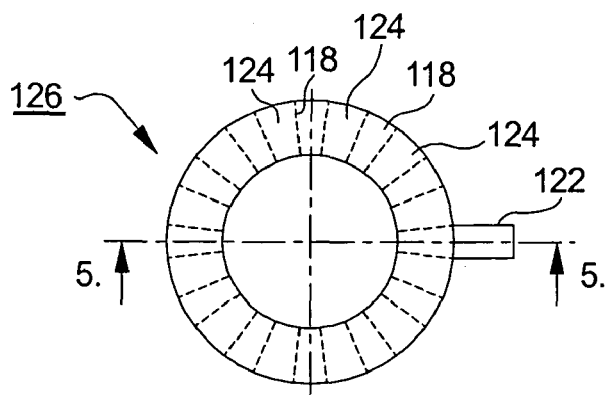
FIG. 4 is a plan view of the prior art separation ring shown in FIG. 3, folded for use in a fuel cell cassette as shown in FIG. 1.
Figure 5:
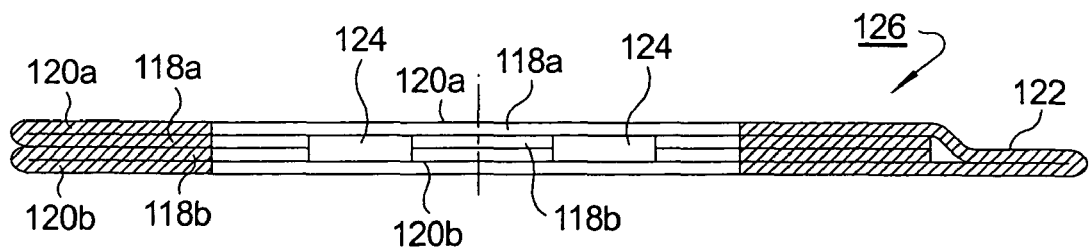
FIG. 5 is a cross-sectional view taken along line 5-5 in FIG. 4.

Referring to FIGS. 1 and 3-5, a prior art spacer ring 126 is provided within each cassette 100 for each anode fuel gas inlet 112a,b and each anode fuel gas outlet 114a,b. In the prior art embodiment shown here for forming prior art spacer rings 126, a pair of rings 120a,b having radial tabs 118 extending from rings 120a,b are connected by a link 122. Radial tabs 118 are folded inward and line up with one another when the two rings 120a,120b are folded over at link 122 to form solid columns of metal, as shown in FIG. 4. Link 122 provides a convenient tab for tack welding of each ring 126 to the cassette shell during assembly. The spaces between the tabs 118 form openings 124 which allow fuel gas to flow from the fuel gas inlets 112 into the anode gas channel (space contained within the cassette), and into the fuel gas outlets 114 from the anode gas channel. The folded spacer rings 126 form solid metal spacers between mounting plate 102 and separator plate 104, thus defining and maintaining a constant spacing therebetween despite assembly and operational loads on the cassette. Prior art rings 126 are formed by stamping from sheet materials similar to those disclosed for forming the mounting plate and separator plate.

Figure 2:
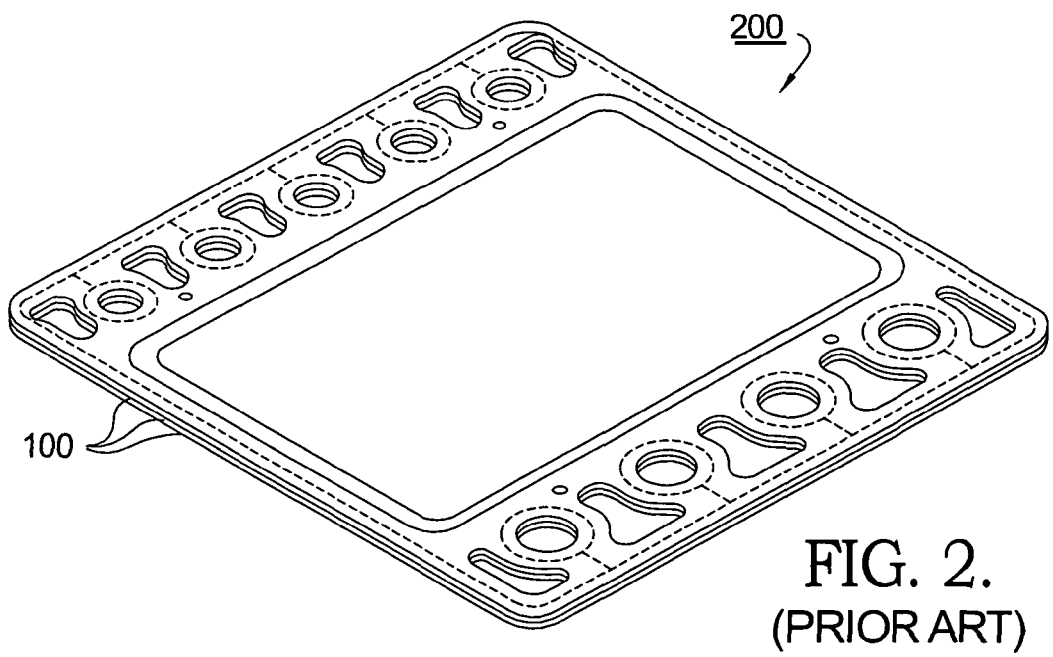
FIG. 2 is an isometric view of a prior art fuel cell stack comprising three cassettes as shown in FIG. 1.
Figure 3:
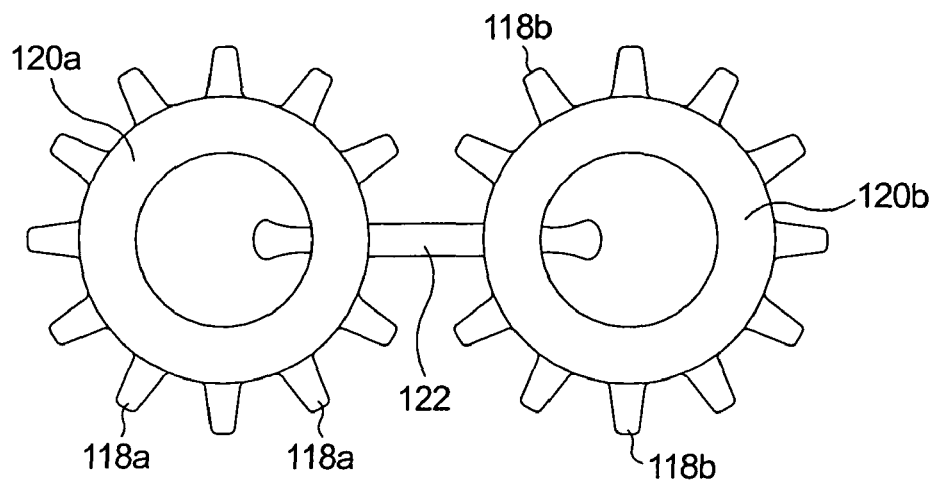
FIG. 3 is a plan view of a prior art separation ring, as stamped from sheet stock.

Referring to FIG. 2, a fuel cell stack 200 is formed by literally stacking together a plurality of individual fuel cell cassettes 100. The cassettes are bonded together outboard of central opening 106 in a pattern surrounding the air and fuel gas inlets and exhausts.

Figure 6:
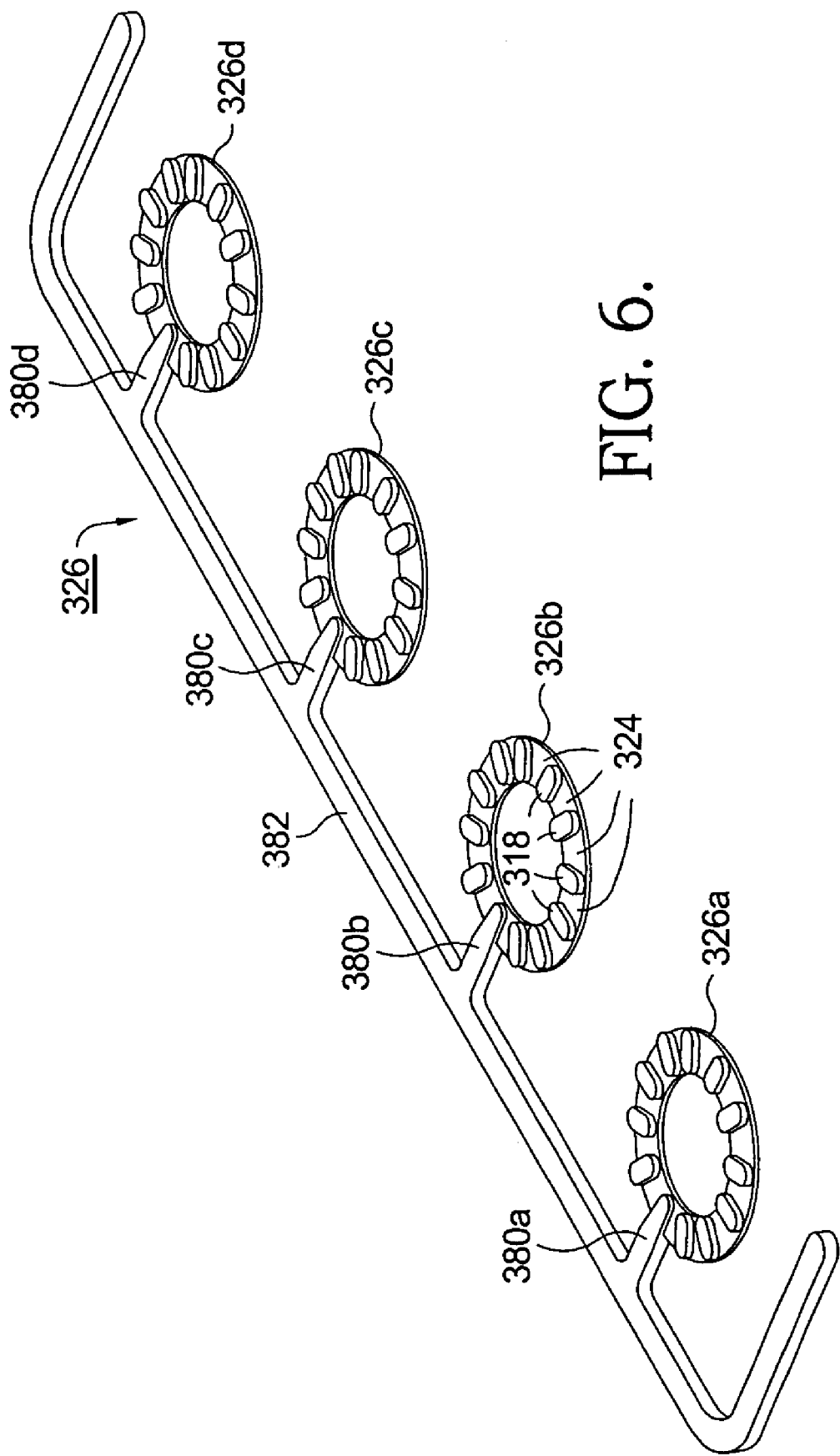
FIG. 6 is an isometric view of a first embodiment of a spacer ring module in accordance with the invention.
Figure 9:
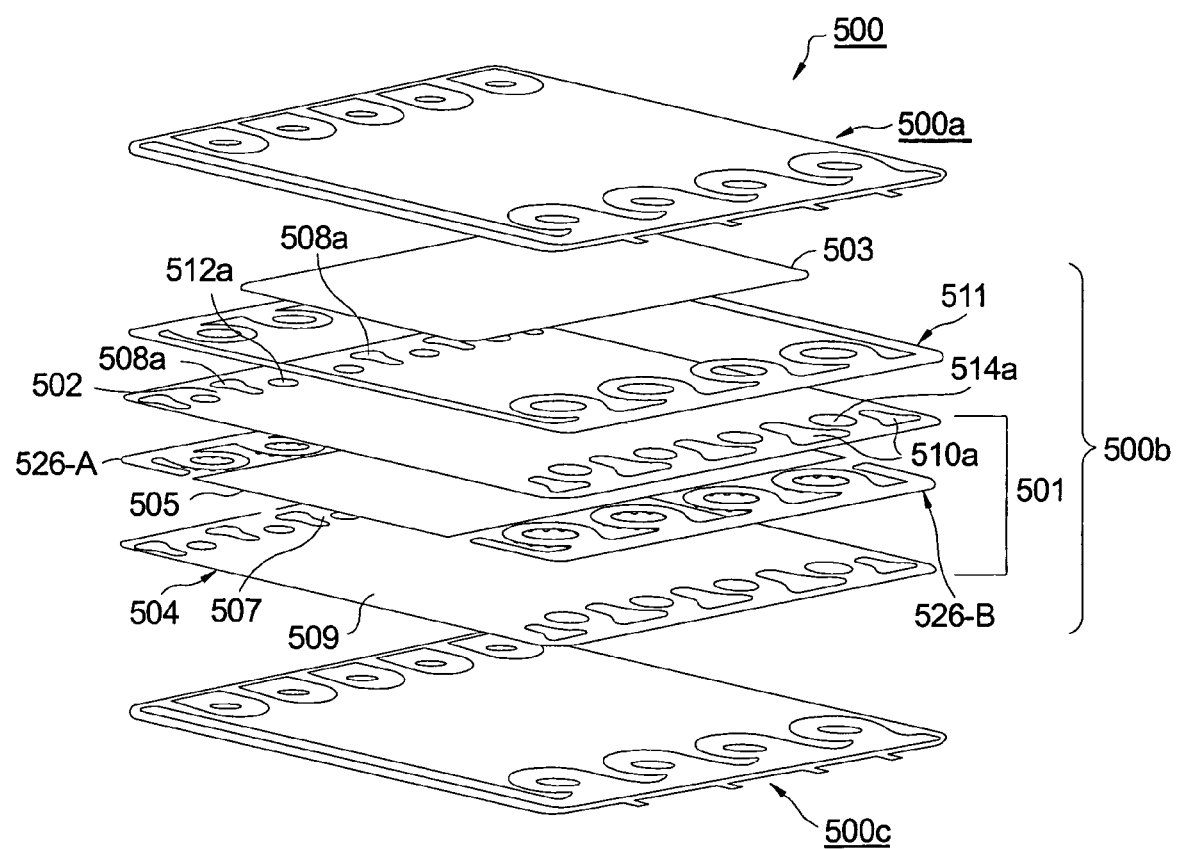
FIG. 9 is an exploded isometric view of a fuel cell stack comprising a cassette formed with spacer rings in accordance with the invention.

Referring now to FIGS. 6 and 9, a first embodiment of a modular spacer ring element 326 comprises a plurality of identical individual spacer rings 326a,326b,326c,326d oriented and attached via individual tethers 380a,380b,380c, 380d to a common rail 382. Each spacer ring 326a-d has radial anode fuel gas flow passages 324 formed into one surface of the ring. The flow passages 324 are separated by columnar ring segments 318 corresponding to prior art tabs 118 which are the full thickness of the ring and therefore can act as structural support columns around the anode fuel gas openings after assembly of a cassette and stack. Spacer ring element 326 can be simply placed into the cassette during the cassette assembly process. The rings are automatically positioned and oriented, and no welding is required. Rail 382 is sandwiched between the abutting edges of fuel cell mounting plate 102 and a separation plate 104 (FIGS. 1 and 9), thereby securing rings 326a-d in position. The axial faces of rings 326a-d are sealed to the fuel cell mounting plate 102 and separation plate 104 by compression during assembly of the cassettes into a fuel cell stack.

Modular spacer ring element 326 is readily formable as a monolith in known fashion via, for example, photochemical machining, powdered metal fabrication, coining, or forging. Two such elements 326, one for anode fuel gas supply and one for anode fuel gas exhaust, are required for each cassette 300. Preferably, element 326 is formed by photochemical machining. Although photochemically machined parts are typically more expensive than simple stampings, a single photochemically machined element 326 is less expensive than the corresponding four stamped prior art rings 126 currently in use (in addition to the assembly savings already described).

Figure 7:
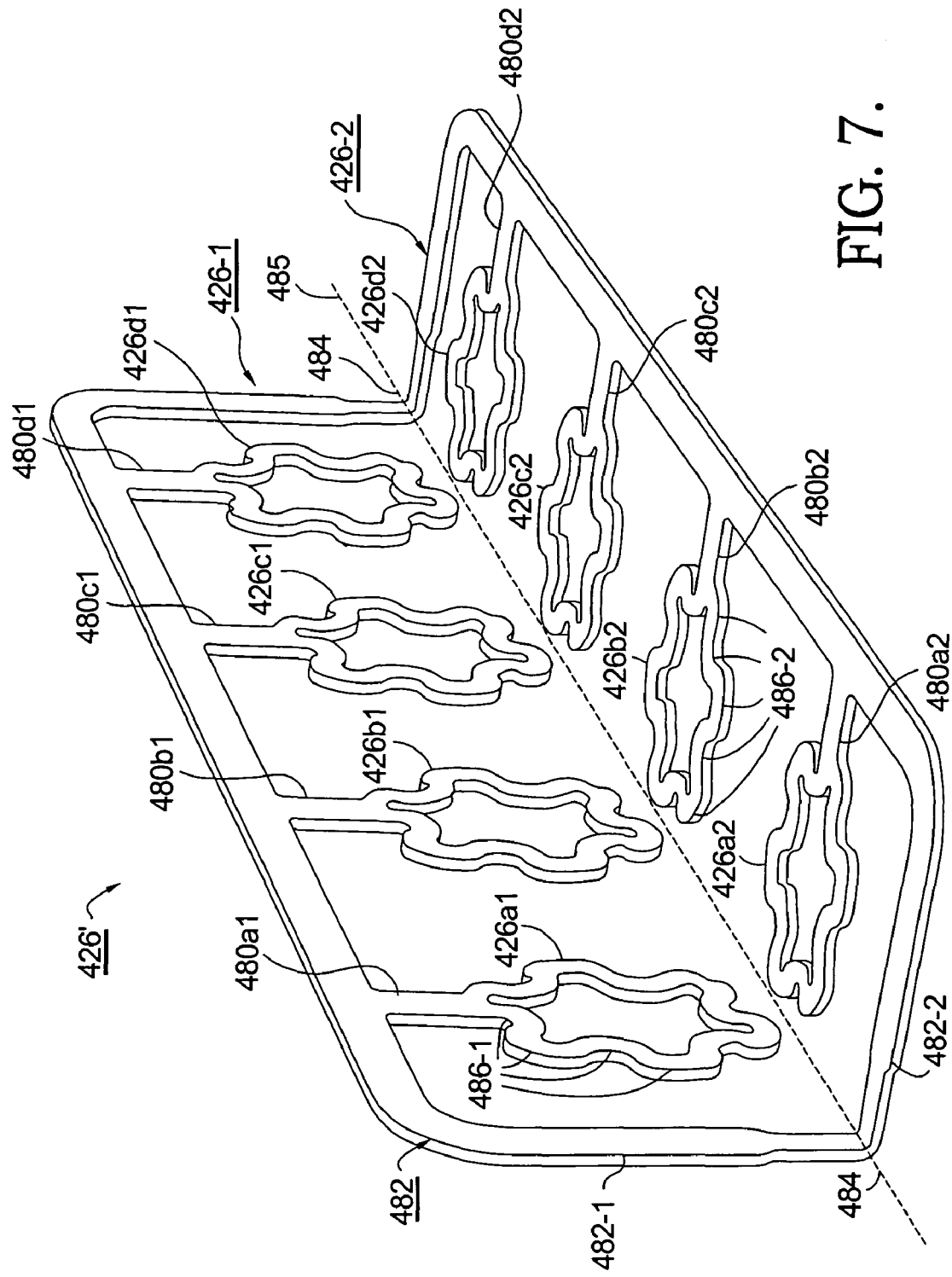
FIG. 7 is an isometric view of a second embodiment of a spacer ring module in accordance with the invention.
Figure 8:
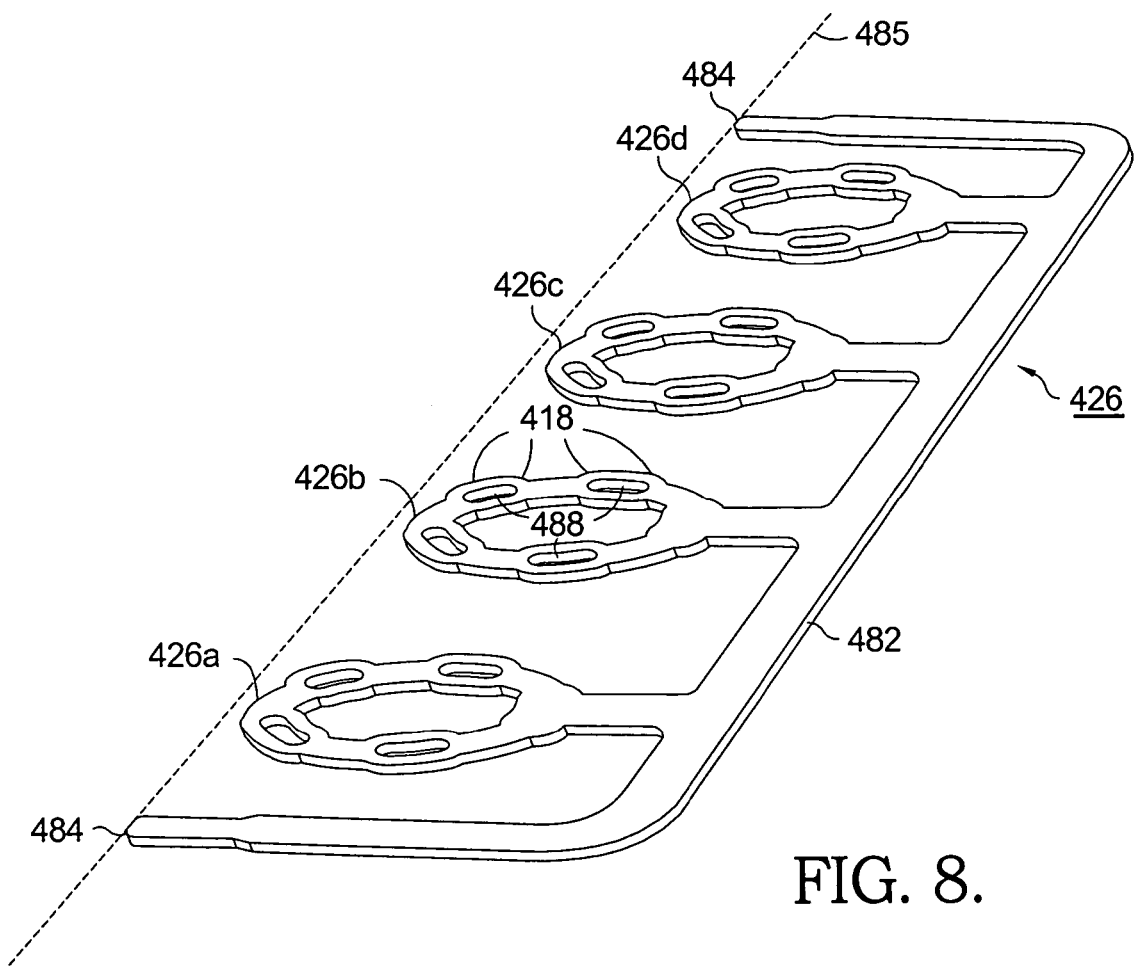
FIG. 8 is an isometric view of the second embodiment as shown in FIG. 7, after folding into a planar configuration for use.

Referring now to FIGS. 7 and 8, a second embodiment of a modular spacer ring element 426 comprises a sub-element 426' having a plurality of identical individual spacer sub-rings 426a1,426a2,426b1,426b2,426c1,426c2,426d1,426d2 oriented and attached via individual tethers 480a1,480a2, 480b1,480b2,480c1,480c2,480d1,480d2 to a common rail 482 formed in two parts, 482-1,482-2, and foldable at points 484.

Second embodiment 426 as formed initially (FIG. 7) is one-half the thickness of first embodiment 326. Each spacer sub-ring 426a1-d2 has a plurality of curves defining an annular pattern of alternating inwardly- and outwardly-extending arcs 486-1,486-2. Arcs 486-1 are angularly shifted from arcs 486-2 by one-quarter cycle (in the present example, by 30°) with respect to tethers 480 such that when first rail portion 482-1 is folded at points 484, defining a folding line 485, onto second rail portion 482-2, as shown in FIG. 8, a fully formed spacer 426 is formed having the same thickness as first embodiment 326. The annular geometry of the two rows of sub-rings is such that, when folded into superposition, radial openings 488 are formed therebetween for passage of anode fuel gas into and out of the stack chimneys. The fully-formed spacer rings 426a-d (FIG. 8) define columns 418 where the sub-rings overlap, corresponding to prior art tabs 118 which are the full thickness of the ring and therefore can act as structural support columns around the anode fuel gas openings after assembly of a cassette and stack. Spacer ring element 426 can be simply placed into the cassette during the cassette assembly process. The rings are automatically positioned and oriented, and no welding is required. Rail 482 is sandwiched between the abutting edges of fuel cell mounting plate 102 and a separation plate 104, thereby securing rings 426a-d in position. The axial faces of rings 426a-d are sealed to the fuel cell mounting plate 102 and separation plate 104 by compression during assembly of the cassettes into a fuel cell stack.

It will be observed that portions 426-1 and 426-2, shown in FIG. 7, are not mirror images but rather inverted images; that is, portion 426-2 may be derived from a second portion 426-1 by simply turning portion 426-1 end-for-end. Thus, sub-element 426' may be formed either by stamping as a single sheet from sheet stock, for folding as described at points 484, or by two identical portions 426-1 oriented as just described for attachment at points 484.

Modular spacer ring element 426 is readily formable in known fashion via, for example, photochemical machining, powdered metal fabrication, coining, or forging. Two such elements 426, one for anode fuel gas supply and one for anode fuel gas exhaust, are required for each cassette 300. Preferably, element 426 is formed by stamping and folding from sheet stock.

Referring to FIG. 9, a portion 500 of a completed fuel cell stack in accordance with the invention comprises first and third cassettes 500a,500c completed in accordance with the invention on either side of an intermediate exploded second cassette 500b.

Second cassette 500b includes a cassette housing 501 including a fuel cell mounting plate 502 and a separation plate 504. Mounting plate 502 includes a large central electrode opening for receiving a cathode mesh air baffle 503. Outboard of the central electrode opening are cathode air inlets 508a, cathode air outlets 510a, fuel gas inlets 512a, and fuel gas outlets 514a. Separation plate 504 is provide with similar and mating air and fuel openings, respectively, said electrode and separation plate inlets and outlets defining respective supply and exhaust chimneys for air and fuel gas. Separation plate 504 is formed as a shallow tray such that a cavity is created between plates 502,504 for receiving fuel cell components and fuel gas. A first anode modular spacer ring element 526-A is installed adjacent anode fuel gas inlets 512a, and a second anode modular spacer ring element 526-B is installed adjacent anode fuel gas outlets 514a. An anode mesh fuel baffle 505 is disposed between ring elements 526-A,526-B. A contact paste layer 507 electrically connects the cathode mesh 503 to the surface of the cathode layer in mounting plate 502. A contact paste layer 509 electrically connects the anode mesh fuel baffle 505 to the separator plate 504. A fusible glass seal 511 seals cassette 500b to cassette 500a. (A similar glass seal is required but not shown between cassette 500c and cassette 500b.)

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A modular spacer ring element for forming a plurality of columns within a fuel cell cassette and for gas communication between a plurality of gas flow chimneys and components within said cassette, comprising a plurality of identical individual spacer rings angularly oriented and attached via individual tethers to a common rail, wherein each individual spacer ring is positionable in said modular spacer ring element to surround a one of said plurality of gas flow chimneys within said cassette and wherein each individual spacer ring includes at least one radial gas flow passage through said ring.

2. A modular spacer ring element in accordance with claim 1 wherein each of said individual rings comprises a plurality of said radial gas flow passages through said ring.

3. A modular spacer ring element in accordance with claim 2 wherein adjacent of said plurality of radial gas flow passages are angularly separated by columnar ring segments which define the thickness of said ring element.

4. A modular spacer ring element in accordance with claim 3 wherein said element is a monolith, and wherein said thickness of said ring element corresponds to a predetermined desired distance between a mounting plate and a separator plate within said cassette.

5. A modular spacer ring element in accordance with claim 3 comprising:

a) a first modular part having a plurality of first sub-ring elements attached by a plurality of first tethers to a first rail, wherein said first modular part is a fraction of the desired final thickness of said modular spacer ring element, and wherein each of said first sub-ring elements includes a plurality of curves defining a first annular pattern of alternating inwardly- and outwardly-extending features, and wherein said attachment of each of said plurality of first sub-ring elements to said plurality of first tethers is at a first angular orientation with respect to said first tethers;

b) a second modular part having a plurality of second sub-ring elements attached by a plurality of second tethers to a second rail, wherein the thickness of said second modular part is equal to the desired final thickness of said modular spacer ring element minus said fraction of the desired final thickness, and wherein each of said second sub-ring elements includes a plurality of curves defining a second annular pattern of alternating inwardly- and outwardly-extending features, and wherein said attachment of each of said plurality of second sub-ring elements to said plurality of second tethers is at a second angular orientation with respect to said second tethers, and wherein said first and second modular parts when superimposed one upon the other form said modular spacer ring element.

6. A modular spacer ring element in accordance with claim 5 wherein said fraction of desired final thickness of said modular spacer ring element is equal to one-half the desired final thickness said modular spacer ring element.

7. A modular spacer ring element in accordance with claim 5 wherein said first and second modular parts are identical when either one is turned end-for-end with respect to the other.

8. A modular spacer ring element in accordance with claim 5 wherein said first and second modular parts are formed as a single sub-element comprising a folding line therebetween, and wherein said superimposition of said first modular part upon said second modular part is carried out by folding said single sub-element along said folding line.

9. A modular spacer ring element in accordance with claim 5 wherein said single sub-element is formed from sheet stock by stamping.

10. A modular fuel cell cassette comprising:
a) a mounting plate containing an electrolyte element, a cathode element, and an anode element;
b) a separator plate off-spaced from said mounting plate and defining an anode chamber therebetween,
wherein each of said mounting plate and said separator plate includes a first plurality of cathode air and anode fuel gas supply chimneys and a second plurality of cathode air and anode fuel gas exhaust chimneys; and
c) a modular spacer ring element for forming a plurality of columns within said fuel cell cassette and for gas communication between said plurality of anode fuel gas flow supply and exhaust chimneys and said anode chamber,
wherein said modular spacer ring element includes a plurality of identical individual spacer rings angularly oriented and attached via individual tethers to a common rail,
wherein each individual spacer ring is positioned in said modular spacer ring element to surround a one of said plurality of anode fuel gas flow chimneys within said cassette,
wherein each individual spacer ring includes at least one radial gas flow passage through said ring, and
wherein said common rail is captured between the mating edges of said mounting plate and said separator plate.

* * * * *